United States Patent [19]

Takekoshi et al.

[11] Patent Number: 5,773,502

[45] Date of Patent: Jun. 30, 1998

[54] FIRE RETARDANT BLENDS

[75] Inventors: Tohru Takekoshi, Scotia; Farid Fouad Khouri, Clifton Park, both of N.Y.; Franciscus Petrus Maria Mercx; Johannes Jacobus Maria De Moor, both of Bergen op Zoom, Netherlands

[73] Assignee: General Electric Company, Schenectady, N.Y.

[21] Appl. No.: 950,092

[22] Filed: Oct. 14, 1997

[51] Int. Cl.[6] ....................................... C08K 5/03
[52] U.S. Cl. .................. 524/411; 524/281; 524/412; 524/445; 524/447
[58] Field of Search ...................... 524/411, 412, 524/445, 447, 281

[56] References Cited

U.S. PATENT DOCUMENTS

| | | |
|---|---|---|
| 3,671,487 | 6/1972 | Abolins . |
| 4,344,878 | 8/1982 | Dolce . |
| 4,506,050 | 3/1985 | Hergenrother et al. ................ 524/405 |
| 4,582,866 | 4/1986 | Shain . |
| 5,530,052 | 6/1996 | Takekoshi et al. ..................... 524/447 |
| 5,552,469 | 9/1996 | Beall et al. ............................. 524/445 |
| 5,554,674 | 9/1996 | Hamilton . |

FOREIGN PATENT DOCUMENTS

| | | |
|---|---|---|
| 132228 | 1/1985 | European Pat. Off. . |

*Primary Examiner*—Veronica P. Hoke
*Attorney, Agent, or Firm*—Vinit G. Kathardekar; Noreen C. Johnson

[57] ABSTRACT

The instant invention provides a substantially flame retardant composition comprising: (a) a thermoplastic polyester and copolyester material, a halogenated organic fire retardant, antimony oxide, organo clay, and a fluorocarbon polymer. Also provided are compositions comprising glass fibers and stabilizers. The combination of the organo clay and the fluorocarbon polymer exhibits a synergistic effect on the fire retardant properties of the instantly claimed composition. This synergistic effect helps reduce the amount of the halogenated organic fire retardant in the instantly claimed flame retardant composition.

20 Claims, No Drawings

5,773,502

FIRE RETARDANT BLENDS

FIELD OF INVENTION

This invention relates to novel flame retardant compositions comprising reduced amounts of halogenated fire retardant.

BACKGROUND

Different compositions have been studied and used as flame retardant materials, especially compositions comprising polymeric material. A typical composition generally comprises substantial amount of halogenated organic components having fire retarding properties. U.S Pat. No. 4,582,866 discloses a fire retardant composition comprising flame retardant multi-block copolyester composition containing a bromine containing flame retardant. The brominated flame retardant constitutes from about 20 to about 30 percent of the flame retardant composition.

U.S. Pat. No. 3,671,487 describes the use of halogenated flame retardants and phosphorus compounds to render the polyester non-burning or self-extinguishing, together with a polytetrafluoroethylene resin to render a non-dripping polyester resin. U.S. Pat. No. 4,344,878 describes the utilization of halogen containing polycarbonate mixed with antimony oxide together with polytetrafluoro ethylene. U.S. Pat. No. 5,554,674 discloses a halogenated flame retardant absent an antimony containing synergist wherein the flame retardant enhancing additive is a metal acid pyrophosphate.

Another publication that deals with flame retardant materials is EP 0 132 228. This European Patent Application discloses a flame retardant reinforced polyester composition which contains a thermoplastic polyester, a reinforcing filler, an organic flame retardant material comprising a chlorine or bromine compound, alone or in combination with antimony oxide, a organically modified layered silicate, and a metal salt of a 6–22 carbon aliphatic acid.

Halogenated flame retardants, especially bromine containing flame retardants are well known in the art and have been particularly successful as flame retardant additives. Most of these flame retardant compositions comprise either organo clays or fluorocarbon polymers, such as polytetrafluoroethylene (Teflon®), as an anti-dripping agent. However, because of the concern of the impact that bromine and other halogens might have on the environment, there is a definite need for flame retardant blends with reduced halogen content. It is thus the object of the instant invention to provide a flame retardant blend comprising a lesser amount of the halogenated component, preferably not more than 20% by weight of the total blend.

SUMMARY OF THE INVENTION

It has been surprisingly found that combination of organo clays and fluorocarbon polymers, as components of fire retardant blends that comprise thermoplastic polyester and copolyester materials, halogenated organic compound, and antimony oxide, exhibits a synergy that enables substantially lowering the amount of the halogen containing compound and also the amount of antimony oxide used in the fire retardant blend.

The instant invention thus provides a substantially flame retardant composition comprising: (a) a thermoplastic polyester material comprising structural units of Formula I

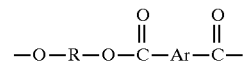

Formula I wherein R represents a divalent hydrocarbon radical containing from about 2 to about 20 carbon atoms, and Ar represents a $C_6$–$C_{15}$ substituted or unsubstituted divalent aromatic radical; (b) from about 5% to about 20% by weight of the thermoplastic polyester and copolyester composition of a halogenated organic fire retardant; (c) from about 1% to about 5% by weight of the thermoplastic polyester and copolyester composition of an antimony oxide; (d) from about 0.25% to about 5% by weight of the thermoplastic polyester and copolyester of an organo clay; and (e) from about 0.02% to about 2% of the thermoplastic polyester material of a fluorocarbon polymer.

A second aspect of the instant invention provides another substantially fire retardant composition comprising: (a) a thermoplastic polyester material comprising structural units of Formula I

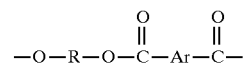

Formula I wherein R and Ar are as defined before; (b) from about 10% to about 30% by weight of the thermoplastic polyester material of fiber reinforcing material; (c) from about 0.1% to about 5% by weight of the thermoplastic material of stabilizers; (d) from about 5% to about 20% by weight of the thermoplastic polyester material of a halogenated organic fire retardant; (e) from about 0.1% to about 5% by weight of the thermoplastic polyester material of a antimony oxide; (f) from about 0.25% to about 5% by weight of the thermoplastic polyester material of an organo clay; and (g) from about 0.02% to about 2% by weight of the thermoplastic polyester material of a fluorocarbon polymer.

DETAILED DESCRIPTION OF THE INVENTION

The present invention is further defined through its preferred embodiments, wherein R represents a divalent hydrocarbon radical containing from 2 to 8 carbon atoms. The preferred R groups are 1,2-ethylene; 1,3-propylene; and 1,4-butylene. Another preferred embodiment provides a composition wherein Ar represents

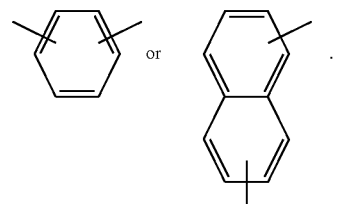

The most preferred divalent aromatic radical is

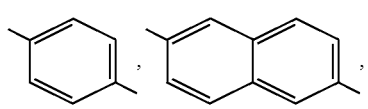

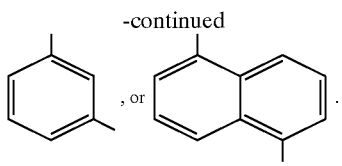

Another preferred embodiment provides a composition wherein the thermoplastic polyester is poly(ethylene terephthalate), poly(propylene terephthalate), poly(butylene terephthalate), or poly(ethylene naphthalene-dicarboxylate), the most preferred polyester being poly(butylene terephthalate). Yet another preferred embodiment provides a composition wherein the organo clay comprises a organo cation exchanged layered silicate. A further preferred embodiment provides a composition wherein the antimony oxide is selected from antimony (mono)oxide, antimony trioxide, antimony tetraoxide, and antimony pentaoxide, with antimony trioxide being most preferred.

The instant invention also provides another substantially fire retardant composition comprising: (a) a thermoplastic polyester material comprising structural units of Formula I

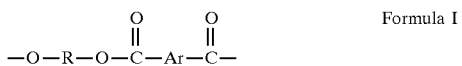

wherein R and Ar are as defined earlier; (b) from about 10% to about 30% by weight of the thermoplastic polyester material of fiber reinforcing material; (c) from about 0.1% to about 5% by weight of the thermoplastic material of stabilizers; (d) from about 5% to about 20% by weight of the thermoplastic polyester material of a halogenated organic fire retardant; (e) from about 0.1% to about 5% by weight of the thermoplastic polyester material of a antimony oxide; (f) from about 0.25% to about 5% by weight of the thermoplastic polyester material of an organo clay; and (g) from about 0.02% to about 2% by weight of the thermoplastic polyester material of a fluorocarbon polymer.

The preferred divalent aromatic radical, Ar, is

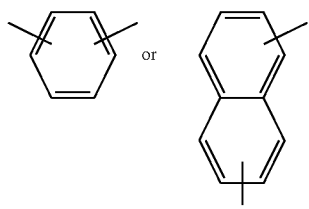

The most preferred aromatic radicals are

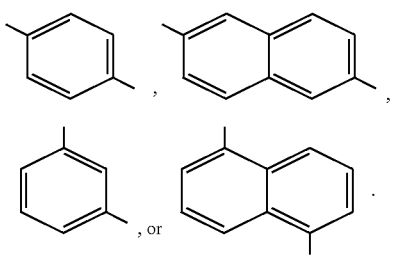

Also provided is a preferred composition wherein R represents a hydrocarbon radical containing from about 2 to about 8 carbon atoms, the most preferred hydrocarbons being 1,2-ethylene; 1,3-propylene; and 1,4-butylene. Preferred thermoplastic polyesters are poly(ethylene terephthalate), poly(propylene terephthalate), poly(butylene terephthalate), and poly(ethylene naphthalenedicarboxylate), with poly(butylene terephthalate) being the most preferred. Another preferred embodiment provides a composition wherein the organo clay is derived from layered silicates. Yet another preferred embodiment provides a composition wherein the antimony oxide is selected from antimony (mono) oxide, antimony trioxide, and antimony tetraoxide, with antimony trioxide being the most preferred antimony oxide.

A preferred embodiment of the instant invention provides a composition wherein reinforcing materials include glass and carbon. The preferred composition comprises glass fibres from about 15% to about 30% by weight of the thermoplastic polyester and copolyester material.

The preferred amount of the halogenated organic fire retardant additive comprises from about 8% to about 12% by weight of the thermoplastic polyester and copolyester material. Another preferred composition is one wherein the fluorocarbon polymer comprises from about 0.25% to about 1% by weight of the thermoplastic polyester and copolyester material. The specifically preferred fluorocarbon polymer is polytetrafluoro ethylene and its copolymers. A further preferred embodiment provides a composition wherein the polytetrafluoroethylene and its copolymer comprises from about 0.04% to about 1% by weight of the thermoplastic polyester and copolyester material.

One skilled in the art recognizes that different materials can be used as the components of the instant invention. The following discussion of the various components used will provide a description of some of the materials that make up the different components. The poly(butylene terephthalate) (PBT) used in the instant invention as a thermoplastic polyester has a high crystalline melting point, about 230° C., along with a high degree and high rate of crystallization. Due to these characteristics, PBT is resistant to various solvents and chemicals while at the same time PBT can be injection molded at fast molding cycles thereby rendering superior properties to the molded parts and enhancing manufacturing productivity.

The divalent radical R is a saturated divalent aliphatic or alicyclic hydrocarbon radical containing from about 2 to about 20 and usually about 2–8 carbon atoms. The preferred alkyl portion for the terephthalates is 1,2-ethylene; 1,3-propylene; or a 1,4-butylene. The most preferred polyesters are poly(ethylene terephthalate) ("PET"), poly(1,4-butylene terephthalate)("PBT"), poly(ethylene naphthalenedicarboxylate) ("PEN"), poly(propylene terephthalate) ("PPT"), poly(butylene naphthalene-dicarboxylate), ("PBN"), and mixtures thereof. It is however known that hydrocarbon groups represented by R may be substituted or unsubstituted with $C_{1-6}$ alkyl groups or $C_{4-10}$ cyclo alkyl groups.

As defined herein, Ar represents a $C_{6-15}$ divalent aromatic moiety, which is generally un-substituted, however substituted phenylene or naphthylene groups can be used. It is well known in the art that aromatic groups substituted with alkyl, cycloalkyl, aryl, araalkyl, halogen(s), phosphorous containing groups and, nitro and amino groups can be used as part of the thermoplastic polyester or copolyster structural backbone. The halogenated organic fire retardant falls in the broad category of halogenated hydrocarbons and halogenated polycarbonates, polyesters, and polyolefins. A detailed description can be found in Flammability Handbook for Plastics, Third Edition, by C. J. Hilado, which is incorporated herein by reference. The preferred fire retardants are selected from halogenated polycarbonates and their oligomers.

The term antimony oxide as used herein includes antimony (mono)oxide, antimony trioxide, and antimony tetra oxide. The instant invention in one of its embodiment uses a phosphate containing component which comprises suitable inorganic phosphates. Typical inorganic phosphates are the alkali metal phosphates including ammonium phosphates, alkali metal hydrogen phosphates, and alkali metal pyrophosphates.

As used herein, organoclay is a layered silicate clay, derived from layered minerals, in which organic structures have been chemically incorporated. Illustrative examples of organic structures are trimethyldodecylammonium ion and N,N'-didodecylimidazolium ion. Since the surfaces of clay layers, which have a lattice-like arrangement, are electrically charged, they are capable of binding organic ions. There is no limitation with respect to the layered minerals employed in this invention other than that they are capable of undergoing an ion exchange with the organic ions. The preferred organo clays are layered minerals that have undergone cation exchange with organo cations and/or onium compounds. Illustrative of such layered minerals are the kaolinite group and the montmorillonite group. It is also within the scope of this invention to employ minerals of the illite group which can include hydromicas, phengite, brammallite, glaucomite, celadonite and the like. Often, however, the preferred layered minerals include those often referred to as 2:1 layered silicate minerals like muscovite, vermiculite, saponite, hectorite and montmorillonite, wherein montmorillonite is often preferred. The layered minerals described above may be synthetically produced. However, most often they are naturally occurring and commercially available. A detailed description of the layered minerals can be found in U.S. Pat. No. 5,530,052 which is incorporated herein by reference.

One embodiment of the instant invention uses glass fibers for reinforcing and other purposes. These glass fillers increase the strength and rigidity of molded parts. The glass fiber or filamentous glass is desirable, when employed as reinforcement in the present compositions. For compositions ultimately to be employed for electrical uses, it is preferred to use fibrous glass filaments comprised of lime-aluminum borosilicate glass that is relatively soda-free. This is known as "E" glass. However, other glass material are useful where electrical properties are not so important, e.g., the low soda glass known as "C" glass. The filaments are made by standard processes known to one skilled in the art, e.g., by steam or air blowing, flame blowing, and mechanical pulling. The preferred filaments for plastic reinforcement are made by mechanical pulling.

The length of the glass filaments and whether or not they are bundled into fibers and the fibers bundled in turn to yarns, ropes or rovings, or woven into mats and the like are also not critical to the invention. However, in preparing the molding compositions it is convenient to use the filamentous glass in the form of chopped strands of from about ⅛" to about 2" long. In articles molded from the compositions on the other hand, even shorter lengths will be encountered because, during compounding considerable fragmentation will occur.

Stabilizers, as used herein represent agents that deactivate ester interchange catalysts which are generally found in polyester resins. Illustrative examples include zinc phosphate and phosphoric acid. Other stabilizers such as photo stabilizers, antioxidants and the like can also be used in the compositions of the present invention. As used in the instant invention "fluorocarbon polymer" represents polytetrafluoroethylene and its copolymers. The term "thermoplastic polyester" includes polyester and copolyester materials. The fiber reinforcing material as used herein includes glass, carbon, and other reinforcing materials known to one skilled in the art. Other additives known to one skilled in the art can be added for cosmetic purposes. Thus one may add pigments to impart color to the fire retardant blend.

The surprising finding that using a combination of an organo clay and a fluorocarbon polymer, such as polytetrafluoroethylene enables one to reduce the amount of the halogenated organic fire retardant, is illustrated by the following examples. The examples indicate that flame retardant blends that contain only one of organo clay or the fluorocarbon polymer do not possess the desirable flame retardant property. Thus, for example, a flame retardant blend (Example 3) that contains about 12% of the brominated organic fire retardant, by weight of the thermoplastic polyester material, along with the fluorocarbon polymer polytetrafluoroethylene (Teflon®) dispersion, but without the organo clay, fails the UL-94 test. Example 5 which contains 12% of the brominated organic fire retardant, by weight of the thermoplastic polyester material, along with an organo clay but without the Teflon® dispersion, fails the UL-94 test. However, if both the organo clay and the Teflon® dispersion are added to the blend (Example 4), it passes the UL-94 test. This indicates that a combination of the Teflon® dispersion and the organo clay is required for better fire retardant properties. The results are summarized in the tables that follow.

EXPERIMENTAL DETAILS

The instant invention is further illustrated by preparing control specimens and comparing their fire retardant properties with the fire retardant properties of new fire retardant formulations. The new fire retardant formulations were prepared by compounding mixtures of each component using a 20 mm counter rotating twin-screw extruder, followed by injection molding. Components BC-52 and BC-58 are brominated BPA polycarbonate oligomers available from Great Lakes Chemicals and have a bromine content of about 52% and 58% respectively. The T-SAN component is a polytetrafluoro ethylene (PTFE) dispersion in styrene acrylonitrile copolymer having over 50% PTFE content. The various other components of the present invention are summarized in Table 1. Most of the specimens used were ¹⁄₁₆" in thickness, ½" wide and 5" long.

TABLE 1

| Component | Component identity |
|---|---|
| Translink 445 | Surface modified wollastonite |
| Na Montmorillonite (Na Mont.) | Natural montmorillonite refined by soda ash treatment |
| Mont./$C_{12}H_{25}NH_3^+$ | Montmorillonite cation exchanged with dodecylammonium ion |
| Mont./$C_{16}H_{33}N^+(CH_3)_3$ | Montmorillonite cation exchanged with trimethyldodecylammonium ion. |
| Mont./$Im^+(C_{12}H_{25})_2$ | Montmorillonite cation exchanged with N,N'-didodecylimidazolium ion. |
| Mont./$BI^+(C_{14}H_{29})_2$ | Montmorillonite cation exchanged with N,N'-ditetradecylbenzimidazolium ion |
| Claytone HY | Montmorillonite cation exchanged with dimethyl di(hydrogenated tallow)ammonium ion. |
| SCPX-896 | Montmorillonite cation exchanged with methylbishydroxyethyl-(hydrogenated tallow)ammonium ion. |
| Valox ® 195 | polybutylene terephthalate, (weight av. Mol. Wt (Mw) = 45,000) |
| Valox ® 315 | polybutylene terephthalate, (weight av. Mol. Wt (Mw) = 105,000) |
| Claytone APA | Montmorillonite cation exchanged with triethylcetylammonium ion |
| $Sb_2O_3$ conc. | About 85% Antimony oxide concentrate |
| PETS | pentaerythritol tetrastearate |
| Irganox ® 1076 | Octadecyl 3(3,5 di-t-butyl-4-hydroxyphenyl)propionate |

TABLE 1-continued

| Component | Component identity |
|---|---|
| Zinc Phosphate (Zn Phos.) | Zinc phosphate, ester-interchange inhibitor |

TABLE 2

| Example No. | 1 wt % | 2 wt % | 3 wt % | 4 wt % | 5 wt % |
|---|---|---|---|---|---|
| Valox ® 315 | 69.12 | 76.74 | 81.32 | 81.32 | 81.4 |
| BC-58 | 20 | 15 | 12 | 12 | 12 |
| $Sb_2O_3$ Conc. | 10.5 | 7.88 | 6.3 | 6.3 | 6.3 |
| T-SAN | 0.08 | 0.08 | 0.08 | 0.08 | — |
| Zn phos. | 0.3 | 0.3 | 0.3 | 0.3 | 0.3 |
| Organo clay (% of PBT) | none | none | none | Claytone HY 2 | Claytone HY 2 |
| UL-94 test | V-0 | V-0 | F | V-0 | F |
| Total flame out time (sec) | 8.80 | 10.6 | | 10.2 | |

The examples in Table 2 above illustrate that using both the polytetrafluoroethylene (Teflon®) dispersion (T-SAN) and organo clay helps reduce the amount of the brominated compound (BC-58) necessary to achieve a V-0 rating in the UL-94 test. Thus in Example 2, 15% by weight of BC-58 is required to achieve a V-0 rating, and the composition of Example 3 which contains 12% by weight of BC-58, T-SAN, but does not contain any organo clay fails the UL-94 test. Similarly Example 5 shows that in the presence of organo clay and without T-SAN the formulation fails the UL-94 test. In contrast the composition of Example 4, which is the same as Example 3 and 5, except that it contains the organo clay achieves a V-0 rating.

which comprises 10%, by weight, of the brominated fire retardant and, both T-SAN and the organo clay, has a V-0 rating, while Example 6 which comprises the same amount of BC-58 and T-SAN, as Example 7, but lacks the organo clay fail the UL-94 test. Further Examples 9 and 10 also fail the UL-94 test even if they contain twice and three times respectively of the amount of T-SAN compared to Example 7, but do not contain any organo clay. This is indicative of the synergistic effect observed by having both T-SAN and the organo clay in the fire retardant composition. Similarly Examples 11 and 12 also fail the UL-94 test even if they contain twice and three times the amount of the organo clay compared to Example 7, but do not contain any T-SAN.

The synergistic effect is further evident from the UL-94 rating for the above Examples 13, 14, and 15 wherein their composition is the same as Example 7, but they respectively contain 0.75, 0.5, and 0.25% of the organo clay. This demonstrates the benefits of the synergistic effect of having both the T-SAN and the organo clay, even at reduced levels of the organo clay.

TABLE 3

| Example No. | 6 wt % | 7 wt % | 8 wt % | 9 wt % | 10 wt % | 11 wt % | 12 wt % | 13 wt % | 14 wt % | 15 wt % |
|---|---|---|---|---|---|---|---|---|---|---|
| Valox ® 315 | 84.45 | 84.37 | 84.45 | 84.29 | 84.21 | 84.45 | 84.45 | 84.37 | 84.37 | 84.37 |
| BC-58 | 10 | 10 | 10 | 10 | 10 | 10 | 10 | 10 | 10 | 10 |
| $Sb_2O_3$ conc. | 5.25 | 5.25 | 5.25 | 5.25 | 5.25 | 5.25 | 5.25 | 5.25 | 5.25 | 5.25 |
| T-SAN | 0.08 | 0.08 | — | 0.16 | 0.24 | — | — | 0.08 | 0.08 | 0.08 |
| Zn phos. | 0.3 | 0.3 | 0.3 | 0.3 | 0.3 | 0.3 | 0.3 | 0.3 | 0.3 | 0.3 |
| Organo Clay (% of PBT) | none | Claytone HY 1 | Claytone HY 1 | none | none | Claytone HY 2 | Claytone HY 3 | Claytone HY 0.75 | Claytone HY 0.5 | Claytone HY 0.25 |
| UL-94 test | F | V-0 | F | F | F | F | F | V-0 | V-0 | V-0 |
| Flame out time (sec.) | | 15.9 | | | | | | | 15.9 | |

The above examples, 6–12, indicate the synergistic effect of using both T-SAN and the organo clay. Thus Example 7,

TABLE 4

| Example No. | 16 wt % | 17 wt % | 18 wt % | 19 wt % | 20 wt % | 21 wt % |
|---|---|---|---|---|---|---|
| Valox ® 315 | 84.37 | 84.45 | 84.37 | 84.45 | 84.37 | 84.45 |
| BC-58 | 10 | 10 | 10 | 10 | 10 | 10 |
| $Sb_2O_3$ Conc. | 5.25 | 5.25 | 5.25 | 5.25 | 5.25 | 5.25 |
| T-SAN | 0.08 | — | 0.08 | — | 0.08 | — |
| Zn phos. | 0.3 | 0.3 | 0.3 | 0.3 | 0.3 | 0.3 |
| Organo clay | Claytone APA | Claytone APA | SCPX-896 | SCPX-896 | Mont./ $C_{12}NH_3^+$ | Mont./ $C_{12}NH_3^+$ |
| (% of PBT) | 2 | 2 | 2 | 2 | 2 | 2 |

TABLE 4-continued

| Example No. | 16 wt % | 17 wt % | 18 wt % | 19 wt % | 20 wt % | 21 wt % |
|---|---|---|---|---|---|---|
| UL-94 test | V-0 | F | V-0 | F | V-0 | F |
| Total flame out time (sec.) | 15.8 | | 20.8 | | 35.5 | |

The above examples also illustrate the synergistic effect obtained by including T-SAN and the organo clay in the fire retardant blend whereby the blend exhibits enhanced fire retardant properties. As indicated by the above examples, fire retardant blends that include both T-SAN and the organo clay pass the UL-94 test (Examples 16, 18 and 20) while the others (Examples 17, 19 and 21) which do not include both T-SAN and the organo clay do not pass the UL-94 test.

TABLE 5

| Example No. Component | | 22 wt % | 23 wt % | 24 wt % | 25 wt % | 26 wt % | 27 wt % |
|---|---|---|---|---|---|---|---|
| Valox ® 315 Powder | 8 | 4.37 | 84.37 | 84.37 | 84.37 | 84.37 | 84.37 |
| BC-58 | 1 | 10 | 10 | 10 | 10 | 10 | 10 |
| Sb$_2$O$_3$ conc. | 5 | 5.25 | 5.25 | 5.25 | 5.25 | 5.25 | 5.25 |
| T-SAN | | 0.08 | 0.08 | 0.08 | 0.08 | 0.08 | 0.08 |
| Zinc Phos. | | 0.3 | 0.3 | 0.3 | 0.3 | 0.3 | 0.3 |
| Na Mont. (% of PBT) | | 1.0 | 0.5 | 0.25 | | | |
| Translink 445 (% of PBT) | | | | | 1.0 | 0.5 | 0.25 |
| UL-94 Test | | F | F | F | F | F | F |

Table 5 lists Examples that contain a natural clay, one of which (Na Mont.) is a precursor of the organo clay used in the present invention, while Translink 445 is a surface treated mineral filler. These examples illustrate that an organo clay is necessary to obtain the synergistic effect. Precursors of organo clays or surface treated naturally occurring clays do not afford the same effect, as indicated by the result that Examples 22–27 fail the UL-94 test.

TABLE 6

| Example No. | 28 wt. % | 29 wt. % | 30 wt. % |
|---|---|---|---|
| Valox ® 195 | 35 | 35 | 35 |
| Valox ® 315 | 29.3 | 32.05 | 30.65 |
| 10μ Glass Fiber | 17 | 17 | 17 |
| T-SAN | 0.6 | 0.6 | 0.6 |
| Sb$_2$O$_3$ conc. | 4.75 | 4.75 | 4.75 |
| BC-52 | 12.75 | 10 | 10 |
| Claytone HY | — | — | 1.4 |
| PETS | 0.2 | 0.2 | 0.2 |
| Zinc phos. | 0.2 | 0.2 | 0.2 |
| Irganox ® 1076 | 0.2 | 0.2 | 0.2 |
| UL-94 Test | V-0 | V-1 | V-0 |

The examples in Table 6 above, contain glass fibers. Comparing Examples 29 and 30, it can be seen that Example 30(which contains both the organo clay and the Teflon® dispersion) has a V-0 rating in the UL-94 test while Example 29 which does not contain the organo clay has a lower (V-1) UL-94 rating.

The UL-94 test is used to determine the fire retardant properties of materials. The test was used to determine the fire retardant properties of the various blends and the results were measured using a "V" value. Thus a V-0 value indicates superior fire retardant properties. A higher "V" value indicates inferior fire retardant properties. Thus materials classified as V-0 shall not have, among other things, any specimens which burn with flaming combustion for more than 10 seconds after application of the test flame, and not have a total flaming combustion time exceeding 50 seconds for the 10 flame applications for each set of five specimens. The Standard UL-94 test characteristics are determined according to the vertical burning test of the Underwriters Laboratories, Inc., 1980.

What is claimed is:

1. A substantially flame retardant composition comprising:

(a) a thermoplastic polyester material comprising structural units of Formula I

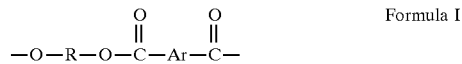

Formula I wherein R represents a divalent hydrocarbon radical containing from about 2 to about 20 carbon atoms, and Ar represents a $C_6$–$C_{15}$ substituted or unsubstituted divalent aromatic radical;

(b) from about 5% to about 20% by weight of the thermoplastic polyester material of a halogenated organic fire retardant;

(c) from about 1% to about 5% by weight of the thermoplastic polyester material of an antimony oxide;

(d) from about 0.25% to about 5% by weight of the thermoplastic polyester and copolyester of an organo clay; and (e) from about 0.02% to about 2% of the thermoplastic polyester material of a fluorocarbon polymer.

2. A composition of claim 1, wherein

R represents a divalent hydrocarbon radical containing from about 2 to about 8 carbon atoms; and Ar represents

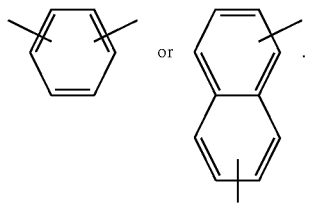

3. A composition of claim 2, wherein

R is 1,2-ethylene; 1,3-propylene; or 1,4-butylene; and

Ar represents

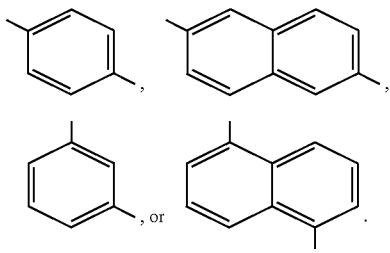

4. A composition of claim 3 wherein the thermoplastic polyester material is poly(ethylene terephthalate), poly(propylene terephthalate), poly(butylene terephthalate), or poly(ethylene naphthalenedicarboxylate).

5. A composition of claim 4 wherein the thermoplastic polyester is poly(butylene terephthalate).

6. A composition of claim 3 wherein the organo clay comprises organo cation exchanged layered silicates.

7. A composition of claim 3 wherein the antimony oxide is antimony (mono)oxide, antimony trioxide, or antimony tetraoxide.

8. A composition of claim 7 wherein the antimony oxide is antimony trioxide.

9. A substantially flame retardant composition comprising:
(a) a thermoplastic polyester material comprising structural units of Formula I

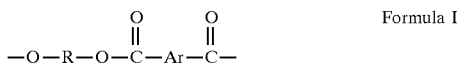

Formula I wherein R represents a hydrocarbon radical containing form about 2 to about 20 carbon atoms, and Ar represents a $C_6$–$C_{15}$ divalent aromatic radical;
(b) from about 10% to about 30% by weight of the thermoplastic polyester material of fiber reinforcing material;
(c) from about 0.1% to about 5% by weight of the thermoplastic polyester material of stabilizers;
(d) from about 9% to about 20% by weight of the thermoplastic polyester material of a halogenated organic fire retardant;
(e) from about 0.1% to about 5% by weight of the thermoplastic polyester material of an antimony oxide;
(f) from about 0.25% to about 3% by weight of the thermoplastic polyester material of an organo clay; and
(g) from about 0.02% to about 2% by weight of the thermoplastic polyester material of a fluorocarbon polymer.

10. A composition of claim 9 wherein:
R represents a divalent hydrocarbon radical containing from about 2 to about 6 carbon atoms; and Ar represents

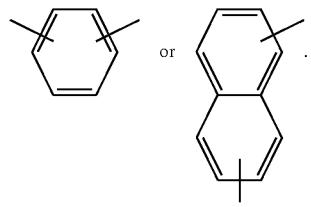

11. A composition of claim 10 wherein:
R represents 1,2-ethylene, 1,3-propylene, or 1,4-butylene; and Ar represents

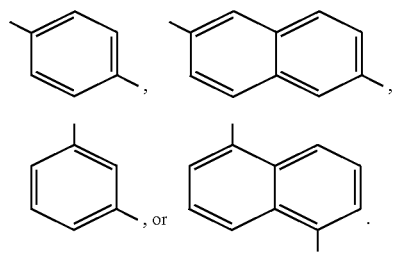

12. A composition of claim 11 wherein the thermoplastic polyester is poly(ethylene terephthalate), poly(propylene terephthalate), poly(butylene terephthalate), or poly(ethylene naphthalenedicarboxylate).

13. A composition of claim 12 wherein the thermoplastic polyester is poly(butylene terephthalate).

14. A composition of claim 11 wherein the organo clay is derived from layered silicates, or montmorillonite.

15. A composition of claim 11 wherein the antimony oxide is selected from antimony (mono) oxide, antimony trioxide, and antimony tetraoxide.

16. A composition of claim 11 wherein the glass fibers comprise from about 15% to about 25% by weight of the thermoplastic polyester and copolyester material.

17. A composition of claim 11 wherein the halogenated organic fire retardant comprises from about 8% to about 12% by weight of the thermoplastic polyester and copolyester material.

18. A composition of claim 11 wherein the organo clay comprises from about 0.25% to about 1% by weight of the thermoplastic polyester and copolyester material.

19. A composition of claim 18 wherein the fluorocarbon polymer is polytetrafluoroethylene and comprises from about 0.04% to about 1% by weight of the thermoplastic polyester and copolyester material.

20. A composition of claim 11 wherein the organo clay comprises organo cation exchanged layered silicates.

* * * * *